United States Patent
Henneberg et al.

(10) Patent No.: US 7,615,875 B1
(45) Date of Patent: Nov. 10, 2009

(54) POWER SYSTEM FOR A TELECOMMUNICATIONS FACILITY

(75) Inventors: Mark A. Henneberg, Olathe, KS (US); Larry L. Johnson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 51 days.

(21) Appl. No.: 11/670,585

(22) Filed: Feb. 2, 2007

(51) Int. Cl.
 *H02K 7/00* (2006.01)
(52) U.S. Cl. ..................................... 290/1 A
(58) Field of Classification Search ........................ 290/1
 See application file for complete search history.

(56) References Cited

U.S. PATENT DOCUMENTS

| | | | |
|---|---|---|---|
| 4,161,657 A | 7/1979 | Shaffer, Jr. | |
| 4,659,634 A * | 4/1987 | Struthers | 429/19 |
| 5,332,927 A | 7/1994 | Paul et al. | |
| 5,477,091 A | 12/1995 | Fiorina et al. | |
| 5,939,799 A | 8/1999 | Weinstein | |
| 5,994,795 A | 11/1999 | Gabillet | |
| 6,011,324 A | 1/2000 | Kohlstruck et al. | |
| 6,047,207 A * | 4/2000 | MacDuff et al. | 600/510 |
| 6,175,217 B1 | 1/2001 | Da Ponte et al. | |
| 6,184,593 B1 | 2/2001 | Jungreis | |
| 6,296,960 B1 * | 10/2001 | Faris et al. | 429/27 |
| 6,304,006 B1 | 10/2001 | Jungreis | |
| 6,498,462 B2 | 12/2002 | Ballantine et al. | |
| 6,503,649 B1 * | 1/2003 | Czajkowski et al. | 429/23 |
| 6,522,955 B1 | 2/2003 | Colborn | |
| 6,534,210 B2 * | 3/2003 | Luken et al. | 429/13 |
| 6,541,940 B1 | 4/2003 | Jungreis | |
| 6,551,731 B1 * | 4/2003 | Berg et al. | 429/13 |
| 6,559,551 B2 | 5/2003 | Graage et al. | |
| 6,615,118 B2 | 9/2003 | Kumar | |
| 6,630,750 B2 | 10/2003 | McAndrews | |
| 6,670,721 B2 | 12/2003 | Lof et al. | |
| 6,703,722 B2 * | 3/2004 | Christensen | 307/71 |
| 6,841,893 B2 | 1/2005 | Maiwald et al. | |
| 6,879,052 B1 * | 4/2005 | Johnson | 290/1 A |
| 6,885,112 B2 | 4/2005 | Johnson | |
| 6,902,837 B2 * | 6/2005 | McCluskey et al. | 429/9 |
| 6,930,402 B1 | 8/2005 | Johnson et al. | |
| 6,960,838 B2 | 11/2005 | Johnson | |
| 6,992,401 B1 | 1/2006 | Johnson | |
| 7,000,395 B2 | 2/2006 | Wai et al. | |
| 7,014,932 B2 * | 3/2006 | Halter et al. | 429/22 |

(Continued)

FOREIGN PATENT DOCUMENTS

JP 2006179347 A * 7/2006

(Continued)

*Primary Examiner*—Joseph Waks

(57) ABSTRACT

A reliable power supply solution for a telecommunications site or facility provides a combined primary and backup source of electrical power. One aspect of the solution takes the form of a power system delivering power redundantly via a first fuel cell device and a second fuel cell device, both devices producing DC electrical power. The first fuel cell device may be configured to provide a steady state supply of DC electrical power to meet the demands of multiple types of telecommunications equipment at the facility, while the second fuel cell device may be configured to provide a more limited amount of DC electrical power specifically for continuous operation of one type of telecommunication circuitry component, such as a programmable logic circuit.

14 Claims, 2 Drawing Sheets

U.S. PATENT DOCUMENTS

| | | | |
|---|---|---|---|
| 7,081,687 B2 | 7/2006 | Johnson | |
| 7,098,548 B2 | 8/2006 | Johnson | |
| 7,112,891 B2 | 9/2006 | Johnson et al. | |
| 7,119,458 B2 * | 10/2006 | Barnes et al. | 307/65 |
| 7,157,803 B2 | 1/2007 | Meyers et al. | |
| 7,183,015 B2 * | 2/2007 | Stolten et al. | 429/17 |
| 7,208,241 B2 * | 4/2007 | Edlund et al. | 429/19 |
| 7,242,104 B1 | 7/2007 | Johnson | |
| 7,245,032 B2 | 7/2007 | Willets et al. | |
| 7,245,034 B2 | 7/2007 | Johnson | |
| 7,250,231 B2 * | 7/2007 | Edlund | 429/23 |
| 7,256,506 B2 | 8/2007 | Johnson | |
| 7,316,242 B2 * | 1/2008 | Porter et al. | 137/255 |
| 7,370,666 B2 * | 5/2008 | Willets et al. | 137/487.5 |
| 7,436,079 B2 | 10/2008 | Meyers | |
| 7,456,513 B2 | 11/2008 | Meyers et al. | |
| 2005/0270164 A1 * | 12/2005 | McDonald et al. | 340/638 |
| 2006/0038533 A1 | 2/2006 | Johnson et al. | |
| 2006/0263656 A1 | 11/2006 | Johnson et al. | |
| 2006/0286416 A1 | 12/2006 | Willets et al. | |
| 2007/0027913 A1 * | 2/2007 | Jensen et al. | 707/104.1 |
| 2007/0057510 A1 | 3/2007 | Meyers et al. | |
| 2007/0132317 A1 | 6/2007 | Willets et al. | |
| 2007/0138872 A1 | 6/2007 | Willets et al. | |
| 2007/0151751 A1 * | 7/2007 | Robbins et al. | 174/17 GF |
| 2007/0152506 A1 | 7/2007 | Meyers et al. | |
| 2007/0200435 A1 | 8/2007 | Willets et al. | |
| 2007/0200533 A1 | 8/2007 | Willets et al. | |
| 2008/0071482 A1 * | 3/2008 | Zweigle et al. | 702/62 |
| 2008/0082180 A1 * | 4/2008 | Blevins et al. | 700/29 |
| 2008/0094868 A1 * | 4/2008 | Meyers et al. | 363/98 |
| 2008/0115505 A1 * | 5/2008 | Willets et al. | 60/790 |
| 2008/0203821 A1 | 8/2008 | Johnson | |
| 2008/0203822 A1 | 8/2008 | Johnson | |
| 2008/0217998 A1 * | 9/2008 | Parmley | 307/65 |

FOREIGN PATENT DOCUMENTS

WO    WO 9813966 A1 *   4/1998

* cited by examiner

POWER SYSTEM FOR A TELECOMMUNICATIONS FACILITY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Telecommunications service providers are increasingly concerned about maintaining reliable network connections for both voice and data transmissions. One particular area of concern is the maintenance of an adequate power supply at various sites along a telecommunications network in order to ensure telecommunication equipment and facilities housing such equipment are functioning properly. For instance, at a remotely located telecommunications facility, such as a wireless communication site (a "cell site") utilizing a base transceiver system (station), the loss of power from a commercial electric utility typically results in a "dead area" where no wireless communications are supported by the particular cell site.

Backup power supply for telecommunications network sites has traditionally been supplied through diesel generators and the like, or lead-acid batteries. There are many disadvantages, however, to each solution. Among other things, diesel generators often emit large amounts of pollution during operation, and are also prone to mechanical breakdown. Furthermore, such generators and the accompanying fuel storage device for supplying fuel take up significant amount of space per unit of power produced, making such devices unsuitable for use at telecommunications sites where space is critical. Lead-acid batteries also require significant maintenance over time, and further suffer from a declining ability over time to hold a maximum amount of energy. This results in the useful lifespan of such batteries oftentimes being shorter than a rated lifespan for the batteries.

SUMMARY

A power supply solution for a telecommunications facility provides redundant power delivery for reliable operation of telecommunications equipment. In embodiments, the power supply solution serves as a combined primary and backup source of electrical power.

In one aspect, a power system of the present invention provides redundant power delivery through a first fuel cell device and a second fuel cell device, both devices producing DC electrical power. The second fuel cell device is specifically adapted to receive a supply of methanol fuel and consume such fuel to generate the DC electrical power. On the other hand, the first fuel cell device is of a different type of fuel cell device than the second fuel cell device. As one example, the first fuel cell device may be configured to provide a steady state supply of DC electrical power to meet the demands of multiple types of telecommunications equipment at the facility, while the second fuel cell device may be configured to provide a more limited amount of DC electrical power specifically for continuous operation of one type of telecommunication circuitry component, such as a programmable logic circuit. The power system may also include one or more devices operable to supply AC electrical power, such as a microturbine generator and/or an electric utility line, and a rectifier for converting the AC electrical power to DC electrical power.

In another aspect, the power system includes first and second fuel cell devices, a DC bus, and power circuitry. The power circuitry is adapted to selectively electrically couple the DC bus with the first fuel cell device, the second fuel cell device and a first telecommunications circuitry component, and to selectively electrically couple the second fuel cell device directly with the first telecommunications circuitry. The power circuitry may also electrically couple the DC bus with a rectifier handling AC electrical power from a particular source, such as a microturbine generator and/or an electric utility line, and may couple the DC bus with additional telecommunications components.

In another aspect, a method is presented for supplying power redundantly to a telecommunications site. According to the method, DC electrical power is provided from a first source to a set of telecommunications equipment during a first operational phase. DC electrical power is also provided from a second source to a first telecommunications circuitry component of the set of telecommunications equipment during a second operational phase, the second source being in the form of a methanol type fuel cell. As one example, the first operational phase may be a steady state phase for operations of a telecommunications facility (primary power or backup power), while the second phase may represent a temporary or emergency phase where power is provided to a limited number of telecommunications circuitry components, such as a programmable logic controller.

Additional advantages and features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION

Embodiments of the present invention relate to a power supply solution to ensure various telecommunications circuitry components located at a specific site or facility have a reliable source of electrical power when one or more particular power sources become unavailable. In particular, the solution utilizes a methanol-type fuel cell as one of a number of backup power sources for supplying DC electrical power to telecommunications equipment.

Figure 1:
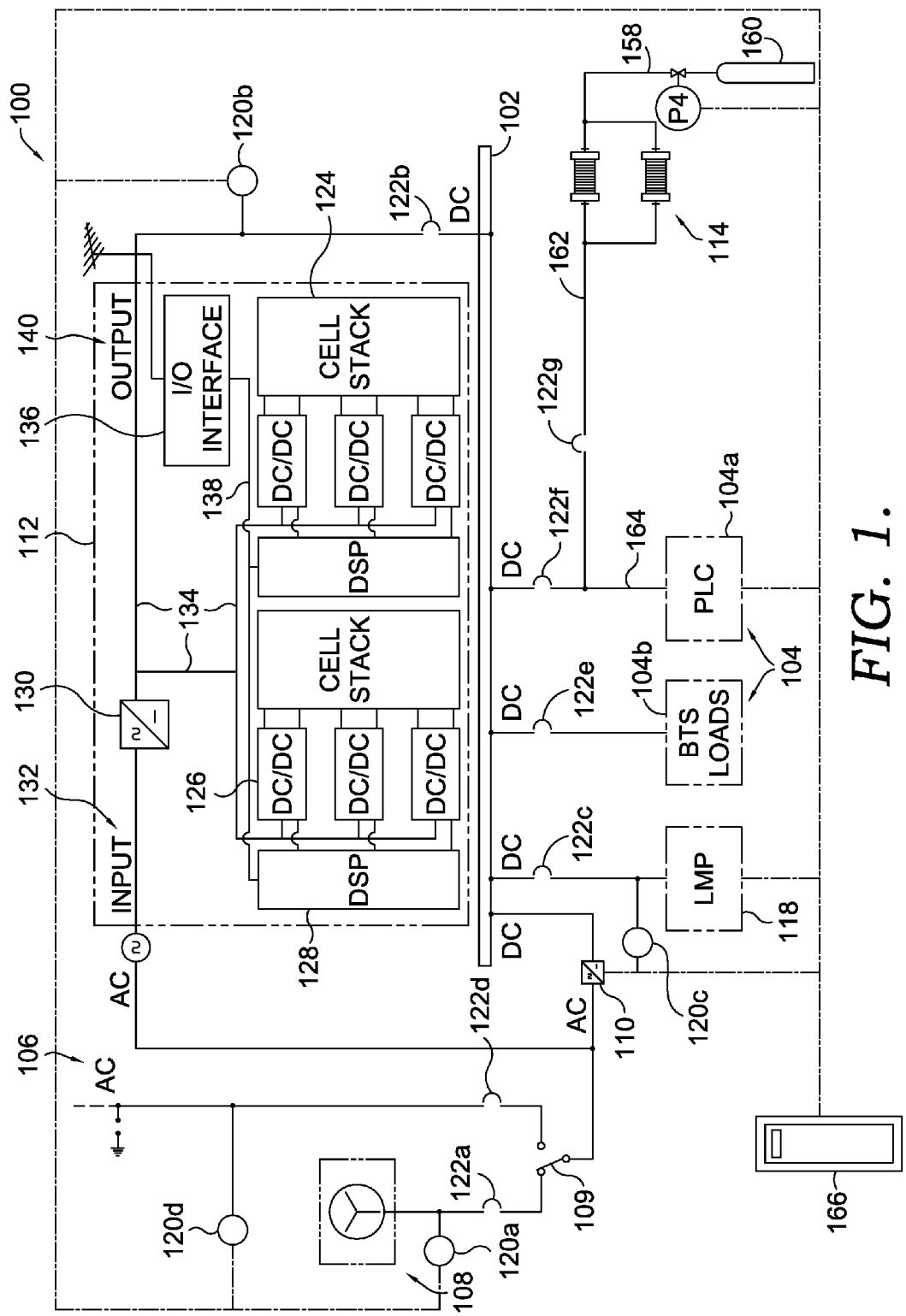
FIG. 1 is a schematic view of one embodiment of a redundant power system for a telecommunications facility.

Turning to FIG. 1, one embodiment of a redundant power system 100 is depicted. The system 100 provides DC electrical power to a DC bus 102 electrically coupled with various power consumption or storage components, including circuitry components 104 involved in handling telecommunications activities. AC electrical power is supplied by a commercial utility 106 or a microturbine generator 108, depending on the position of an automatic transfer switch 109 sensing whether the utility 106 or generator 108 is supplying sufficient electrical power. Electrical current traveling through the switch 109 (the particular source, utility 106 or microturbine generator 108, depending on the switch being closed) is fed to a rectifier 110, which outputs DC current for supply to the DC bus 102. Other power supply sources for the DC bus 102 include a first fuel cell device 112, such as zinc based fuel cell, and a second fuel cell device 114, such as a methanol type fuel cell, both providing DC current output. In particular, the second fuel cell device 114 may be configured to supply DC electrical power directly to one or more circuitry components 104 without supplying such power to other components 104. Thus, the second fuel cell device 114 may provide power in a last resort or emergency situation to selected circuitry components 104 in order to maintain minimal operations of a telecommunications facility. As one example, if all other power supply components of the system 100 are non-operational, the second fuel cell device 114 in the form of a methanol fuel cell allows a programmable logic circuit (PLC) 104a to monitor the operation of a telecommunication site (e.g., a wireless communication facility employing a base transceiver system 104b, or BTS) and performed time stamped data collection. This is despite the fact that full telecommunications functions (e.g., supporting wireless cellular communications) would be unavailable at that time. Also electrically connected with the DC bus 102 is a energy storage device 118 that takes DC current from the bus 102, while also supplying power to the bus 102 at a later point in time when needed by power consuming components, such as the circuitry components 104. The energy storage device 118 takes the form of one or more lithium metal polymer batteries (LMPs), but could alternatively be a capacitor or other similar device. The system 100 also employs a set of voltage and current measuring circuitry devices 120a-120d to determine the voltage and/or current conditions within certain electrically conductive lines, and a set of breakers 122a-122g that alternately open and close circuits created by the conductive lines in response to the measured voltage conditions to electrically couple and decouple various components of the system 100 from the DC bus 102. The PLC 104a or other control circuitry determines when to open and close the breakers 122a-122g depending on the voltage and DC current conditions, such that the desired dedicated power supplying component or components (e.g., utility 106, microturbine generator 108, first and second fuel cell devices 112 and 114 and energy storage device 118) are selectively interconnected with the DC bus 102.

In the form of a zinc based fuel cell, the first fuel cell device 112, in a charging mode, takes input AC electrical power and outputs in a discharging mode DC electrical power with an increased current value for supply to the DC bus 102. One example of a suitable zinc based fuel cell devices is the model Zinc-Flow 45® sold by Premium Power Corporation of North Andover, Mass. The device 112 includes a group of cell stacks 124, circuitry 126 for controlling the input current supplied to the cell stacks 124 and taking the output current from the cell stacks 124 to provide dual outputs at different voltages and/or currents, and a microprocessor 128, preferably in the form of a digital signal processor (DSP) measuring the cell stack output voltage and current, and communicating the current state of the device 112 to the PLC 104a or other control circuitry. The AC current received at an input 132 of the device 112 is transformed to DC current by an internal rectifier 130, which is then fed to the circuitry 126 and onto cell stacks 124 through power lines 134. Cell stacks 124, in one embodiment, each provide generally about 50-100 volts of direct current (VDC). Circuitry 126 provides one output of DC current to the power lines 134 and another output of DC current to the microprocessor 128, with the DC current to the power lines being limited to 54 VDC. The microprocessor 128 communicates with an input/output (I/O) interface 136 along signal lines 138, and I/O interface 136 wirelessly communicates with a remote node (e.g., the PLC 104a) to indicate the performance conditions of the device 112. A user can also access the I/O interface 136 locally on the device 112 to check performance conditions. Under normal charging conditions, the AC current flows through input 132 and reaches the cell stacks 124 for storage. Thereafter, when electrical power is needed from the device 112, the cell stacks 124 discharge DC current under the control of the microprocessor 128, the current reaching an output 140 of the device 112 through the power lines 134.

Figure 2:
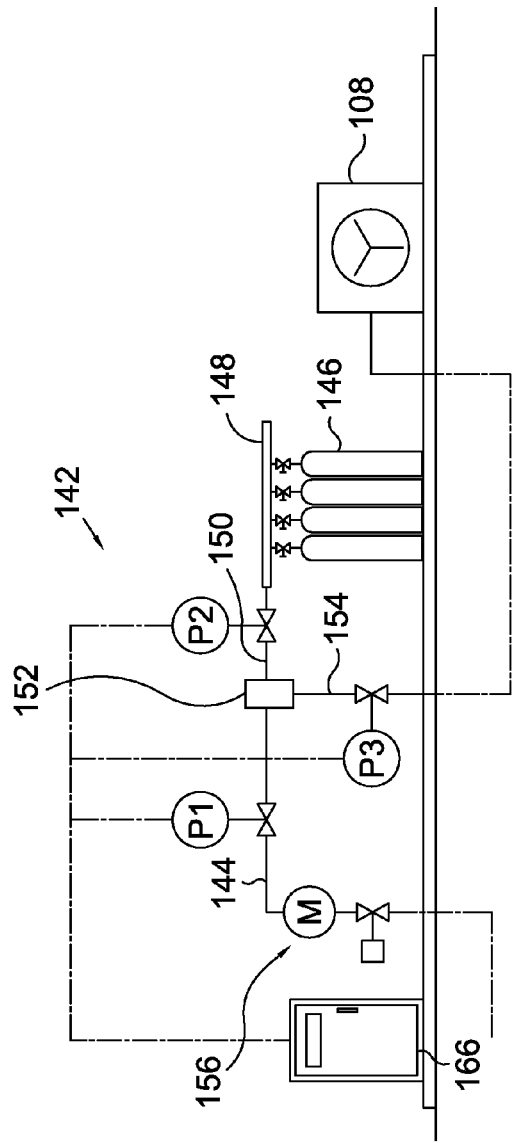
FIG. 2 is a schematic view of the valving and controls utilized to deliver a fuel source to a microturbine generator of the power system of FIG. 1.

With additional reference to FIG. 2, a fuel source delivery subsystem 142 controls how fuel is supplied to the microturbine generator 108. A utility source fuel line 144 (e.g., a natural gas line) operates to deliver the primary source of fuel to the microturbine generator 108. Additionally, a set of pressurized natural gas tanks 146 connected with a common manifold 148 act as a local supply or a secondary source of fuel for the microturbine generator 108, via a backup fuel line 150. Fuel lines 144 and 150 have in-line automated pressure controlled valves P1 and P2, respectively, the opening and closing of which may be controlled by the PLC 104a but is, in each case, closeable automatically if an insufficient pressure reading in the respective line 144, 150 is measured. The fuel lines 144 and 150 also supply fuel directly to a surge tank 152 for absorbing pressure irregularities and thus minimizing any disruptive effects resulting from the opening and closing of valves P1 and P2. Additionally, a downstream fuel line 154 extends from the surge tank 152 to the generator 108 and also includes an in-line automated pressure controlled valve P3, which may likewise be controlled by the PLC 104a. A manual shut-off valve 156 is also located in the utility fuel line 144 upstream of the valve P1. Another in-line automated pressure controlled valve P4 is located within a fuel supply line 158 extending between a methanol fuel tank 160 and the second fuel cell device 114, as shown in FIG. 1. The device 114, in the form of a series of parallel methanol type fuel cells takes the methanol fuel source and generates DC current at an output. As one example, each methanol type fuel cell of the device 114 may produce 25 watts of power. A first conductive line 162 extends from the device 114 output to a second conductive line 164 interconnecting the DC bus 102 with the PLC 104a. This arrangement allows the second fuel cell device 114 to directly power the PLC 104a without supplying DC electrical power to other circuitry components 104 (e.g., BTS 104b) that may be electrically coupled with the DC bus 102.

Figure 3:
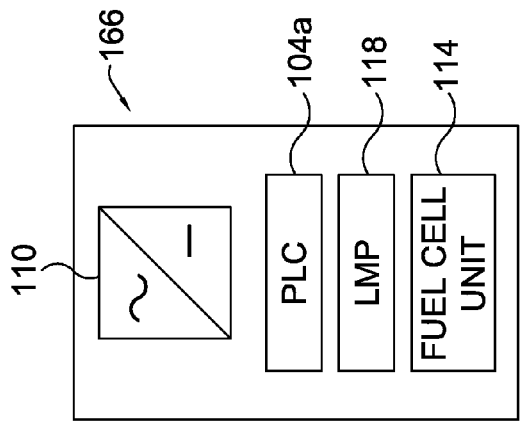
FIG. 3 is an illustrative view of various components of the power system of FIG. 1 located within a control cabinet.

As depicted in FIG. 3, certain components of the system 100 may be housed within a control cabinet 166, for protection from environmental elements or mere convenience of accessing the specified components for maintenance or other issues. For instance, the rectifier 110 handing AC current from the utility 106 and the microturbine generator 108, the PLC 104a or other circuitry components 104, the energy storage device 118 (e.g., LMPs), the second fuel cell device 114 (and tank 160), and potentially the natural gas tanks 146, may be located within the control cabinet 166.

One particular operational scheme for the redundant power system 100 is to utilize each of the power supplying component in a predetermined order, such that when one "senior" component is non-operational, the next "junior" component in the ranking comes on-line to supply electrical power to the DC bus 102. Some components have overlapping on-line conditions, such as in the case of the LMPs 118 discharging to the DC bus 102 when a particular component fails and the next junior component is in a start-up phase of power generation or otherwise has not yet provided the full voltage necessary for continuous operation of circuitry components 104 connected with the DC bus 102. In one preferred arrangement, the ranking of power supplying components from the most senior to the most junior during full operational mode for the telecommunications facility is as follows: microturbine generator 108 powered by utility supplied natural gas (via fuel line 144), then commercial electric utility 106, then microturbine generator 108 powered by local natural gas tanks 146 (via fuel line 150), then the first fuel cell device 112, and then the LMPs or other energy storage device 118. Additionally, the LMPs provide transitional DC electrical power between the operation of the microturbine generator 108 powered by utility supplied natural gas and the commercial electric utility 106, between the operation of the commercial electric utility 106 and the microturbine generator 108 powered by local natural gas tanks 146, and between the operation of the microturbine generator 108 powered by local natural gas tanks and the first fuel cell device 112. After all components supplying adequate electrical power to the DC bus 102 have been exhausted, the second fuel cell device 114 begins operation to supply emergency power to the PLC 104a. It should be understood that when certain power supplying components become available after voltage failure of the particular component, that component may come on-line again if only more junior components are currently available to supply electrical power. Thus, if the automated valves P1 or P2 register sufficient fuel line pressure for operation of the microturbine generator 108, or if circuitry devices 120b-120d measure sufficient voltage and current to meet the demands of the circuitry components 104 enabling full operation of the telecommunications facility (primarily due to being sufficiently recharged by the commercial electric utility 106), then the respective components restart operation to supply the necessary electrical power to the DC bus 102.

Table 1 below provides a summary of the status of the breakers 122a-122g, condition sensed by the circuitry devices 120a-120d, and the status of the automated valves P1, P2, P3 and P4, during each operation phase where one or more power supplying components are on-line to supply electrical power to the DC bus 102 (or in the case of the second fuel cell device 114, to the PLC 104a). It should be understood that the table represents one exemplary operational scheme, and that many other operation schemes may be envisioned depending on the electrical power supply needs of particular circuitry components 104 connected with the DC bus 102. Further, the "Condition Sensed" column in Table 1 indicates the particular condition or conditions sensed by certain circuitry device 120a-120d that causes the next more junior power supply component to come on-line for supplying electrical power to the DC bus 102. For instance, when the device 120a senses a low voltage and/or current output of the microturbine generator 108, in a situation where the generator 108 running on utility supplied fuel is the most senior component that has just been supplying electrical power, the next more junior component, i.e., the commercial electric utility 106, comes on-line to supply power.

TABLE 1

| Power Supplying Component | Breaker Status | Valves Status | Conditioned Sensed |
| --- | --- | --- | --- |
| Microturbine Generator (108) - Utility Supplied Fuel | Breakers 122a, c, d, e, f - Closed<br>Breakers 122 b, g - Open | P1 - Open<br>(P3 Open Regulating)<br>P2, P4 - Closed | Device 120a - Low Voltage/Current output of Microturbine Generator (108) |
| Commercial Electric Utility (106) | Breakers 122a, c, d, e, f - Closed<br>Breakers 122 b, g - Open | P1, P2, P3, P4 - Closed | Device 120d - Low Voltage/Current output of Utility (106) |
| Microturbine Generator (108) - Local Fuel | Breakers 122a, c, d, e, f - Closed<br>Breakers 122 b, g - Open | P2 - Open<br>(P3 Open Regulating)<br>P1, P4 - Closed | Devices 120a, d - Low Voltage/Current output of Microturbine Generator (108) and Utility (106); Device 120b - Adequate Voltage/Current output of First Device (112) |
| First Fuel Cell Device (112) - Zinc-based | Breakers 122a, b, d, e, f - Closed<br>Breakers 122 c, g - Open | P1 - Open<br>P2, P3, P4 - Closed | Devices 120a, b, d - Low Voltage/Current output of Microturbine Generator (108), Utility (106) and First Device (112) |
| LMPs (118) | Breakers 122a, c, d, e, f - Closed<br>Breakers 122 b, g - Open | P1, P2, P3, P4 - Closed | All Devices 120a-d - Low Voltage/Current output of respective power supplying components |
| Second Fuel Cell Device (114) - Methanol Type | Breakers 122a, c, d, e, g - Closed<br>Breakers 122 b, f - Open | P4 - Open<br>P1, P2, P3 - Closed | |

As can be understood, the present invention provides a power supply solution implementing redundant power delivery for reliable operation of telecommunications equipment. Furthermore, it should be appreciated by those skilled in the art that above described systems and methods are not limited to what has been particularly shown and described above. Rather, all matter shown in the accompanying drawings or described above is to be interpreted as illustrative and not limiting. Accordingly, the scope of the present invention is defined by the appended claims rather than the foregoing description.

What is claimed is:

1. A power system that provides redundant power delivery to a telecommunications facility, comprising:
   a first fuel cell device operable to generate DC electrical power; and
   a second fuel cell device adapted to receive a supply of methanol fuel and consume the methanol fuel to generate DC electrical power,
   (1) wherein the second fuel cell device is electrically coupled with a programmable logic circuit that monitors an operation of the telecommunication facility,
   (2) wherein the second fuel cell device is operable, upon the power system sensing that insufficient power is being supplied to the telecommunications facility, to provide DC power directly to the programmable logic circuit to facilitate time stamped data collection, and
   (3) wherein the first fuel cell device and the second fuel cell device are different types of fuel cell devices.

2. The power system of claim 1, wherein the first fuel cell device receives incoming AC electrical power in a charging mode at an input and supplies DC electrical power in a discharging mode at an output such that current measured at the output exceeds the current measured at the input.

3. The power system of claim 2, wherein the first fuel cell device is a zinc based fuel cell.

4. The power system of claim 1, further comprising:
   a third device operable to supply AC electrical power; and
   a rectifier operable to convert the AC electrical power from the third device to DC electrical power.

5. The power system of claim 4, wherein the third device comprises a microturbine generator.

6. The power system of claim 1, further comprising a DC bus adapted for selective electrical coupling with the first fuel cell device, the second fuel cell device and the programmable logic circuit.

7. The power system of claim 6, wherein the DC bus is further adapted for electrical coupling with a base transceiver system.

8. A method for supplying power redundantly to a telecommunications site, comprising:
   providing AC electrical power from a microturbine generator powered by one or more of utility-supplied natural gas and locally supplied natural gas;
   upon sensing that insufficient power is being supplied to the telecommunications site from the microtrubine generator, providing AC electrical power from a commercial utility provider;
   upon sensing that insufficient power is being supplied to the telecommunications site from the commercial utility provider, providing DC electrical power from a zinc-based fuel cell device;
   upon sensing that insufficient power is being supplied to the telecommunications site from the zinc-based fuel cell device, providing DC power from a lithium metal polymer battery, wherein the lithium metal polymer battery is also configured to provide power to the telecommunications site during transition from one source of power to another source of power; and
   upon sensing that insufficient power is being supplied to the telecommunications site from the lithium metal polymer battery, providing DC power from a methanol-type fuel cell device directly to a programmable logic circuit to facilitate time stamped data collection.

9. The method of claim 8, further comprising converting the AC electrical power to DC electrical power for supply to the set of telecommunications equipment.

10. The method of claim 8, further comprising providing a DC bus adapted for electrical coupling with the zinc-based fuel cell device the methanol-type fuel cell device, and the programmable logic circuit, wherein the step of providing DC electrical power from the methanol-type fuel cell device includes providing DC electrical power to the programmable logic circuit directly from the methanol-type fuel cell device, thereby bypassing the DC bus.

11. A power system for a telecommunications facility providing redundant power delivery, comprising:
   a microturbine generator powered by at least one of utility-supplied natural gas and natural gas from locally-stored tanks;
   a zinc-based fuel cell device operable to generate DC electrical power;
   a lithium metal polymer battery operable to provide transitional DC electrical power between operation of the microturbine generator and operation of the zinc-based fuel cell;
   a methanol-type fuel cell device adapted to receive a supply of methanol fuel and consume the methanol fuel to generate DC electrical power;
   a DC bus; and
   power circuitry adapted to selectively electrically couple the DC bus with the zinc-based fuel cell device, the methanol-type fuel cell device and a first telecommunications circuitry component, and to selectively electrically couple the methanol-type fuel cell device directly with the first telecommunications circuitry, thereby bypassing the DC bus.

12. The power system of claim 11, further comprising a rectifier operable receive AC electrical power from the microturbine generator at an input and to convert the received AC electrical power to DC electrical power at an output, wherein the power circuitry is adapted to selectively electrically couple the DC bus with the rectifier.

13. The power system of claim 11, wherein the power circuitry is adapted to selectively electrically couple the DC bus with a base transceiver system.

14. The power system of claim 11, further comprising:
   an energy storage device operable to supply DC electrical power;
   wherein power circuitry is adapted to selectively electrically couple the DC bus with the energy storage device.

* * * * *